United States Patent [19]
Takahashi

[11] Patent Number: 5,984,069
[45] Date of Patent: Nov. 16, 1999

[54] ELECTROMAGNETIC CLUTCH

[75] Inventor: Toshio Takahashi, Gunma, Japan

[73] Assignee: Ogura Clutch Co., Ltd., Japan

[21] Appl. No.: 09/223,913

[22] Filed: Dec. 31, 1998

[30] Foreign Application Priority Data

Jan. 19, 1998 [JP] Japan ................................. 10-021432

[51] Int. Cl.⁶ ............................ F16D 19/00; F16D 27/00; F16D 37/02
[52] U.S. Cl. ............................. 192/84.961; 192/84.941; 192/84.1; 335/296
[58] Field of Search ..................... 192/84.961, 84.941, 192/84.1, 53.2; 335/296

[56] References Cited

U.S. PATENT DOCUMENTS

| | | | |
|---|---|---|---|
| 5,320,206 | 6/1994 | Maejima | 192/84.961 |
| 5,687,823 | 11/1997 | Nakagawa et al. | 192/84.961 |

FOREIGN PATENT DOCUMENTS

| | | |
|---|---|---|
| 0741254 | 3/1995 | European Pat. Off. . |
| 0821176 | 7/1996 | European Pat. Off. . |
| 0848180 | 2/1997 | European Pat. Off. . |
| 56-138528 | 10/1981 | Japan . |

*Primary Examiner*—Rodney H. Bonck
*Assistant Examiner*—Tisha D. Waddell
*Attorney, Agent, or Firm*—Blakely Sokoloff Taylor & Zafman

[57] ABSTRACT

In an electromagnetic clutch, an annular exciting coil having a pair of connecting portions at its intermediate winding portion, a coil bobbin, having a first coil holding groove for holding the exciting coil, and a coil cover, having a second coil holding groove for holding the exciting coil projecting from the coil bobbin, are stored in a yoke to expose a storing portion formed on the coil cover and having a pair of through holes from which the connecting portions of the exciting coil are led out. A temperature fuse is stored in the storing portion and has a pair of lead wires. A pair of intermediate terminals are arranged to oppose each other through a predetermined distance, and have lead press-insertion grooves where the lead wires of the temperature fuse are to be press-inserted, and coil press-insertion grooves where the connecting portions of the exciting coil led out from the through holes are to be press-inserted. A terminal cover fixes the intermediate terminals. A rotor has an annular groove for storing the yoke, and a first friction surface formed by a side surface opposite to the annular groove. An armature has a second friction surface to be magnetically attracted by the first friction surface.

8 Claims, 6 Drawing Sheets

ELECTROMAGNETIC CLUTCH

BACKGROUND OF THE INVENTION

The present invention relates to an electromagnetic clutch mounted on a driven device such as a compressor for an automobile air conditioning system and, more particularly, to an electromagnetic clutch in which a temperature fuse fused by slip heat generated by the trouble of the driven device is disposed in a yoke.

An electromagnetic clutch is disposed on a power transmission line between a driving device and a driven device, and is used as a switch to drive or stop the driven device. In order to prevent an adverse influence on peripheral devices when the driven device breaks down, in a conventional electromagnetic clutch, a temperature fuse, which is fused by slip heat generated by slip rotation between the friction surface of a rotor coupled to the driving device and the friction surface of an armature coupled to the driven device, is connected in series to an exciting coil in a yoke.

In such an electromagnetic clutch, as proposed in Japanese Patent Laid-Open No. 56-138529 (reference 1) and U.S. Pat. No. 5,687,823 (reference 2), the temperature fuse is disposed in the opening portion of the yoke opposing a side surface of the rotor which is opposite to its friction surface, thereby improving the response performance of the temperature fuse.

In the electromagnetic clutch proposed in reference 1, a coil bobbin formed with a coil leading groove and a temperature fuse holding portion is provided to one flange portion of a winding frame portion which opens in the radial direction. When winding an exciting coil on this coil bobbin, an intermediate winding portion is led out from the coil leading groove. The led exciting coil is cut to form a pair of connecting portions, and the connecting portions are connected to the lead wires of the temperature fuse through bonding terminals. A case for the temperature fuse is fixed as it is fitted in the holding portion. The initial winding end portion and terminal winding end portion of the exciting coil are connected to a positive lead wire and a negative lead wire, respectively.

In a coil assembly having the above structure, the positive and negative lead wires are led out from an insulating bush, inserted in the annular grooves of the yoke, and fixed with a resin (to be referred to as a cast resin hereinafter) cast into the annular grooves.

In the electromagnetic clutch proposed in reference 2, the initial winding end portion of the annular exciting coil is connected to a negative lead wire, and the winding end terminal portion constituting one connecting portion is connected to one lead wire of the temperature fuse. The other lead wire of the temperature fuse is connected to one end portion of an extension line prepared to extend the exciting coil, and a positive lead wire is connected to the other end portion of the extension line. A case for the temperature fuse is fitted in a fuse holding member applied on the exciting coil.

In a coil assembly having the above structure, the positive and negative lead wires are led out from an insulating bush, inserted in the annular grooves of the yoke, and fixed with a resin cast into the annular grooves, in the same manner as in the coil assembly proposed in reference 1. The temperature fuse is assembled to be close to the outer circumferential wall of the inner cylindrical portion of the yoke.

The electromagnetic clutch proposed in references 1 and 2 is mounted on the housing of a compressor for an automobile air conditioning system serving as a driven device. In references 1 and 2, the yoke is fixed to the side surface of the housing, and the rotor inserted with the yoke is rotatably supported by a support, projecting from the side surface of the housing, through a bearing. An armature is supported on the shaft end of a rotary shaft projecting from the support, to be movable only in the axial direction.

In the electromagnetic clutch having this arrangement, when the friction surface of the armature is magnetically attracted by the friction surface of the rotor rotated by driving an automobile engine with the magnetic flux of the energized exciting coil, the compressor is driven. When energization to the exciting coil is disconnected, the magnetic flux disappears, and the armature is separated from the rotor, thereby stopping the driving operation of the compressor.

While the armature is magnetically attracted by the rotor, the rotary shaft of the compressor is locked, so that the two friction surfaces perform slip rotation. Accordingly, the environmental temperature abnormally increases sharply to fuse the temperature fuse. More specifically, the safety switch comprising the temperature fuse provided midway along the winding portion of the exciting coil is turned off to disable energization to the excitation coil. Accordingly, the exciting magnetic flux disappears to separate the armature from the rotor. As a result, a situation in which the belt wound on the rotor is disconnected to disable the driving operation of the other auxiliary machine of the automobile can be prevented.

In the conventional electromagnetic clutch, a pair of connecting portions of the exciting coil are integrally connected to the lead wires of the temperature fuse with the bonding terminals. The case for the temperature fuse is fixed by the holding portion of the coil bobbin or held by the holding member fitted on the exciting coil. This prevents the connecting portions from being broken by the temperature fuse or bonding terminals upon vibration of the automobile engine or compressor. However, since the connecting portions of the exciting coil and the lead wires of the temperature fuse must be connected with the bonding terminals, the assembly operation becomes cumbersome, and an improvement in productivity is difficult to achieve.

In the electromagnetic clutch of reference 2, due to the thermal expansion of the cast resin, a tensile load acts on the lead wires of the temperature fuse. Hence, to cover the lead wires with protection tubes or to form a bent portions (flex portions) on the lead wires is proposed. Since a resin that can be molded at a comparatively low temperature is used as the cast resin, according to the conventional explanation, the temperature fuse will not be fused during molding.

Along with an improvement in productivity and decrease in cost of an electromagnetic clutch for a compressor, this resin molding operation tends to be abolished. Accordingly, another holding means for holding the exciting coil and temperature fuse must be examined.

To cover the surface of the temperature fuse with a thin film and to embed the temperature fuse in a cast resin is also proposed. However, since variations in covering amount of the resin appear as variations in response performance of the temperature fuse, the process control of the quality of the casting operation need be performed with much labor.

SUMMARY OF THE INVENTION

It is an object of the present invention to provide an electromagnetic clutch in which the temperature fuse has excellent response performance and reliability.

It is another object of the present invention to provide an electromagnetic clutch at a low cost by improving the productivity.

In order to achieve the above objects, according to the present invention, there is provided an electromagnetic clutch comprising an annular exciting coil having a pair of connecting portions at an intermediate winding portion thereof, an annular coil bobbin having a first coil holding groove for holding the exciting coil, an annular coil cover having a second coil holding groove for holding the exciting coil projecting from the coil bobbin, a storing portion formed on the coil cover, the storing portion having a pair of through holes from which the connecting portions of the exciting coil are led out, a temperature fuse stored in the storing portion and having a pair of lead wires, a pair of intermediate terminals arranged to oppose each other through a predetermined distance and having lead press-insertion grooves where the lead wires of the temperature fuse are to be press-inserted, and coil press-insertion grooves where the connecting portions of the exciting coil led out from the through holes are to be press-inserted, a terminal cover for fixing the intermediate terminals, a yoke for storing the coil bobbin, the coil cover, and the exciting coil so as to expose the storing portion to an outside, a rotor having an annular groove for storing the yoke and a first friction surface formed by a side surface opposite to the annular groove, and an armature having a second friction surface magnetically attracted by the first friction surface.

DESCRIPTION OF THE PREFERRED EMBODIMENTS

The present invention will be described in detail with reference to the accompanying drawings.

Figure 1:
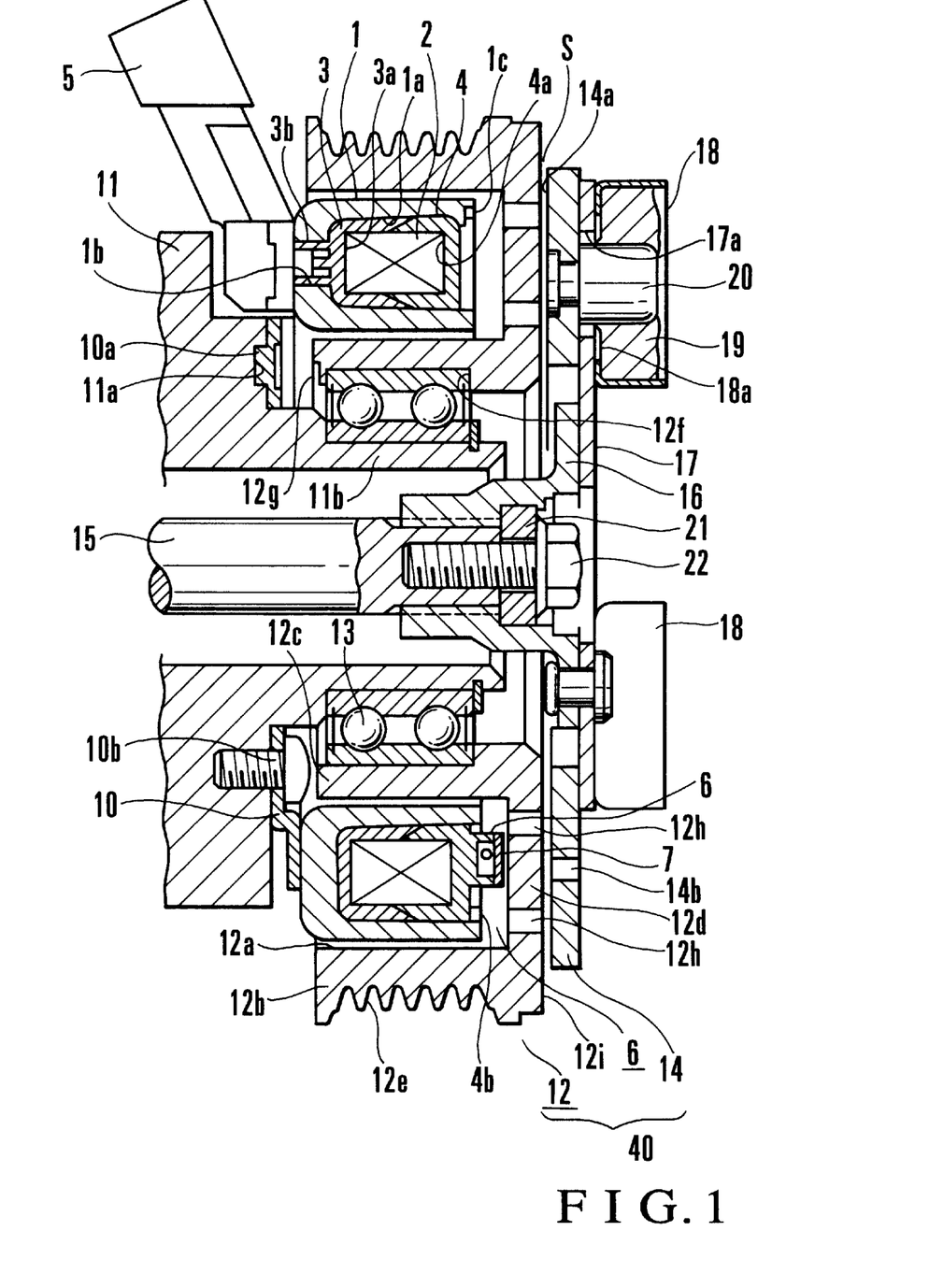
FIG. 1 is a sectional view of an electromagnetic clutch according to the first embodiment of the present invention.

FIG. 1 shows an electromagnetic clutch according to the first embodiment of the present invention. The electromagnetic clutch shown in FIG. 1 is constituted by a yoke assembly 30 fixed to the housing of a compressor for an automobile air conditioning system, and an armature assembly 40 mounted on a rotary shaft 15 of the compressor.

The armature assembly 40 has a rotor 12 and an armature 14. The rotor 12 is made to cover the yoke assembly 30 and is rotatably supported by the support of the housing. The armature 14 has a friction surface 14a opposing a friction surface 12i of the rotor 12 through an air gap.

The yoke assembly 30 has an annular yoke 1 and an exciting coil 2. The yoke 1 has an annular groove 1a opening in the axial direction and having a U-shaped section. The exciting coil 2 is stored in the annular groove 1a of the yoke 1. The exciting coil 2 is surrounded by a coil bobbin 3 and coil cover 4. The coil bobbin 3 is formed with an annular first coil holding groove 3a which opens in the same direction as the annular groove 1a of the yoke 1. The coil cover 4 is formed with an annular second coil holding groove 4a which opens in a direction opposite to the annular groove 1a of the yoke 1.

The bottom portion of the coil bobbin 3 is integrally formed with a storing portion 3b press-inserted in a through hole 1b of the yoke 1. The initial winding end portion and terminal winding end portion of the exciting coil 2 led out into the storing portion 3b of the coil bobbin 3 are electrically connected to a pair of terminals (not shown) on the power supply side which are inserted in a terminal housing 5.

Figure 2:
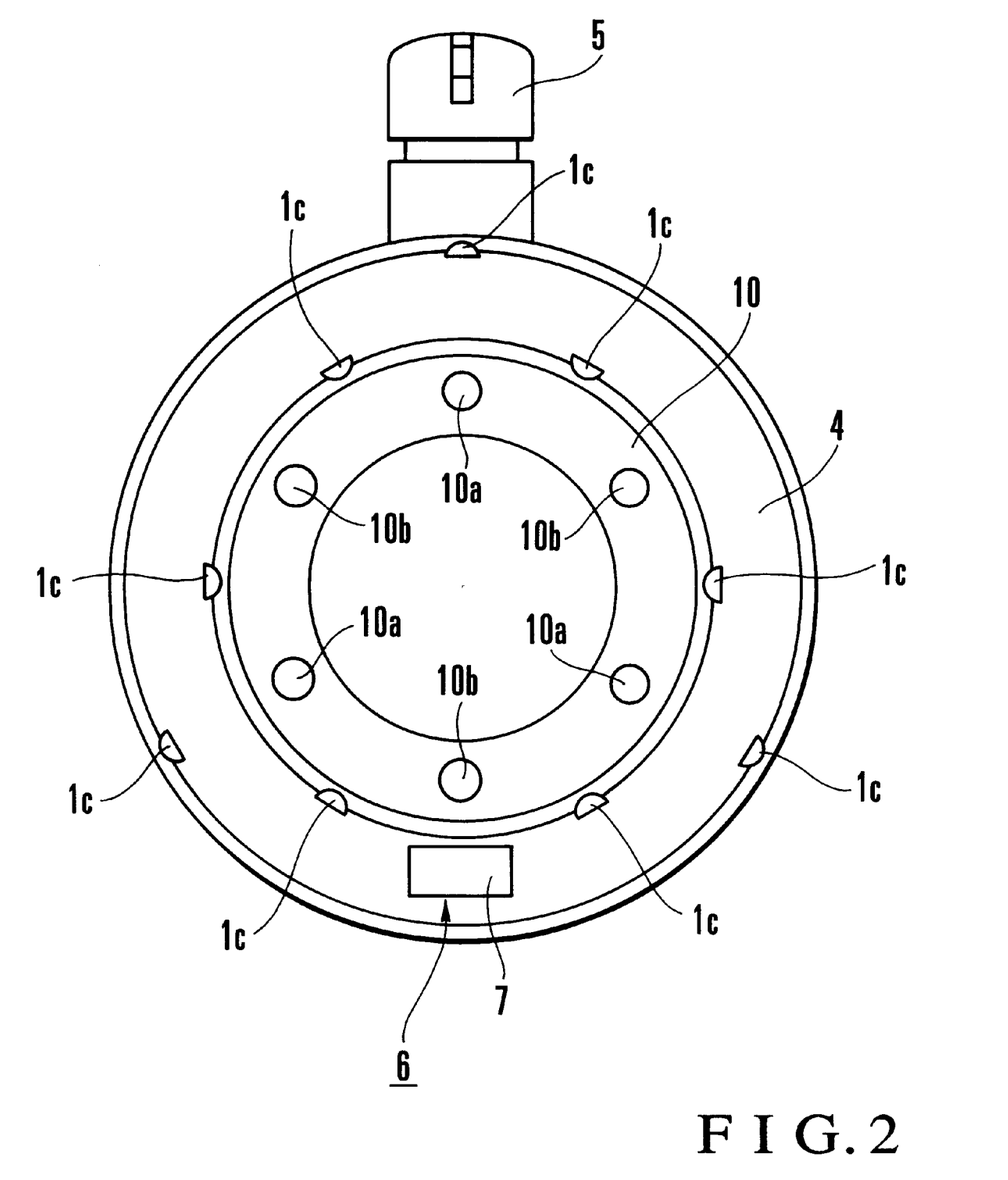
FIG. 2 is a plan view of the yoke shown in FIG. 1.

The opening portion of the coil bobbin 3 and the opening portion of the coil cover 4 respectively form tapered abutment surfaces that engage with each other. When the coil cover 4 is urged against the coil bobbin 3, these abutment surfaces engage with each other. This state is held by a plurality of caulking projections 1c formed on the inner side of the opening end face of the yoke 1 at predetermined intervals, as shown in FIG. 2.

Figure 3:
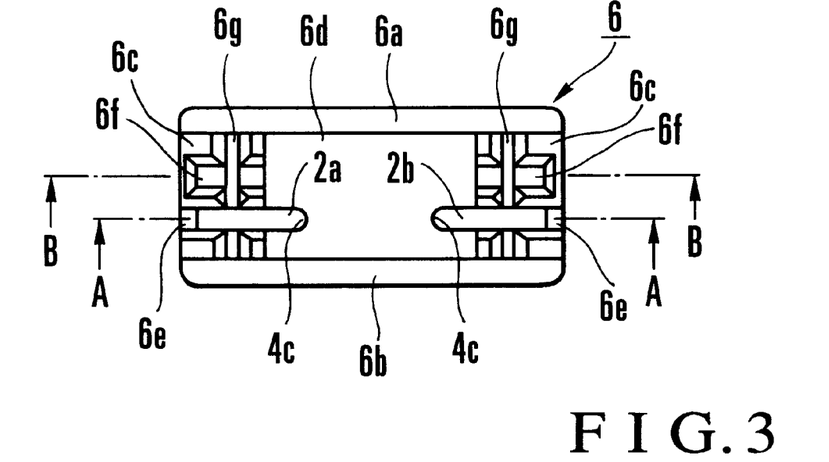
FIG. 3 is a plan view of a storing portion formed in the coil cover shown in FIG. 1.
Figure 4:
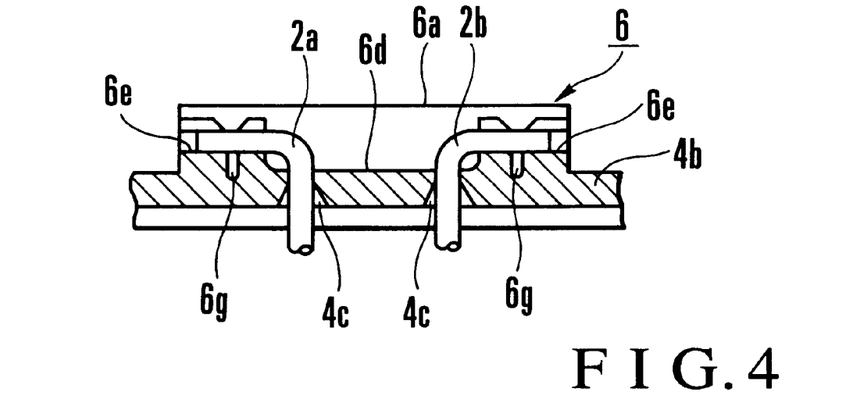
FIG. 4 is a sectional view taken along the line A—A of FIG. 3.
Figure 5:
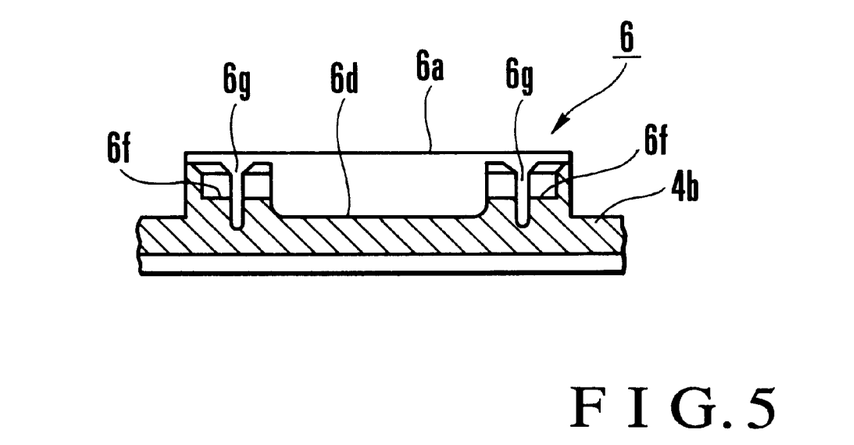
FIG. 5 is a sectional view taken along the line B—B of FIG. 3.

As shown in FIGS. 3 to 5, a pair of through holes 4c are formed in an upper wall portion 4b of the coil cover 4 to be separate from each other at a predetermined distance in the circumferential direction. The outer side surface of the upper wall portion 4b including the through holes 4c is integrally formed with a storing portion 6. Connecting portions 2a and 2b of the exciting coil 2 are led into the storing portion 6 through the through holes 4c. The connecting portions 2a and 2b of the exciting coil 2 are formed by pulling out the intermediate winding portion of the exciting coil 2, when winding the exciting coil 2 with a winding machine, and cutting this intermediate winding portion.

The storing portion 6, formed in the coil cover 4 to project from the opening portion of the yoke 1, is formed into a box shape with an inner side wall 6a, an outer side wall 6b, a pair of side walls 6c, and a bottom portion 6d (the outer side surface of the upper wall portion 4b). The inner side wall 6a corresponds to the radial inner side of the yoke 1. The outer side wall 6b corresponds to the radial outer side of the yoke 1. The pair of side walls 6c are formed to oppose each other so as to connect the two end portions of the side walls 6a and 6b, and are slightly lower (have a smaller projecting amount in the axial direction) than the side walls 6a and 6b. The bottom portion 6d is surrounded by the side walls 6a, 6b, and 6c, and the through holes 4c open in it.

Coil engagement-insertion grooves 6e, where the connecting portions 2a and 2b of the exciting coil 2 are to be engaged and inserted, are formed in the pair of side walls 6c of the storing portion 6 along a straight line extending through the pair of through holes 4c. Lead engagement-insertion grooves 6f, where lead wires 9a of a temperature fuse 9 (to be described later) are to be engaged and inserted, are formed in the side walls 6c to be parallel to the coil engagement-insertion grooves 6e. Terminal engagement-insertion grooves 6g, where intermediate terminals 8 (to be described later) are to be press-inserted, are formed in the side walls 6c to perpendicularly intersect the coil engagement-insertion grooves 6e and lead engagement-insertion grooves 6f.

The coil engagement-insertion grooves 6e, are formed by notching the side walls 6c from the inner walls to the outer walls, and are engaged and inserted in the coil engagement-insertion grooves 6e, such that the distal end portions of the connecting portions 2a and 2b of the exciting coil 2 do not project. Projecting portions 7b of a terminal cover 7 (to be described later) are pressed into a portion, of the coil engagement-insertion grooves 6e, between the distal end portions of the connecting portions 2a and 2b of the exciting coil 2 and the side walls 6c.

The lead engagement-insertion grooves 6f, are formed by notching the side walls 6c from the inner walls to the intermediate portions of the outer walls. A placing portion where a case 9b for the temperature fuse 9 (to be described later) is to be placed is formed on the bottom portion 6d in a space between the pair of lead engagement-insertion grooves 6f.

The terminal cover 7 formed with the same synthetic resin as that used for forming the coil bobbin 3 and coil cover 4 is made to cover the storing portion 6 having such a shape. The abutment surfaces of the storing portion 6 and terminal cover 7 are fixed to each other with an adhesive or any other bonding technique at their entire peripheries.

Figure 6:
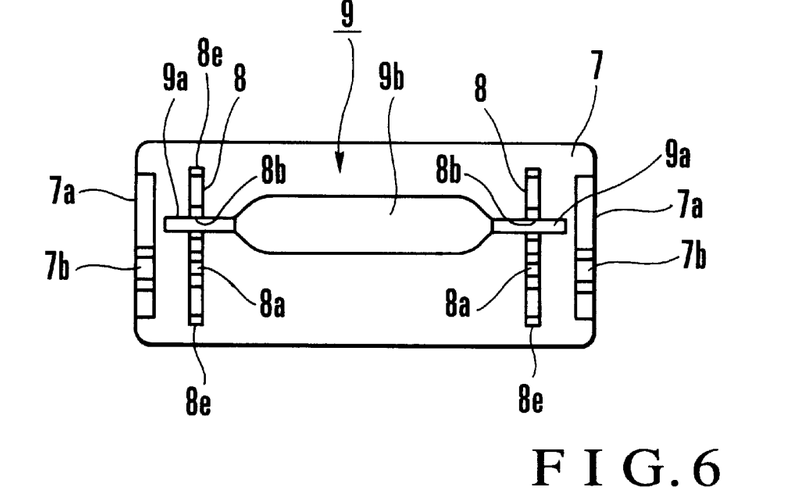
FIG. 6 is a plan view of a terminal cover showing a state wherein a temperature fuse is connected to intermediate terminals.
Figure 7:
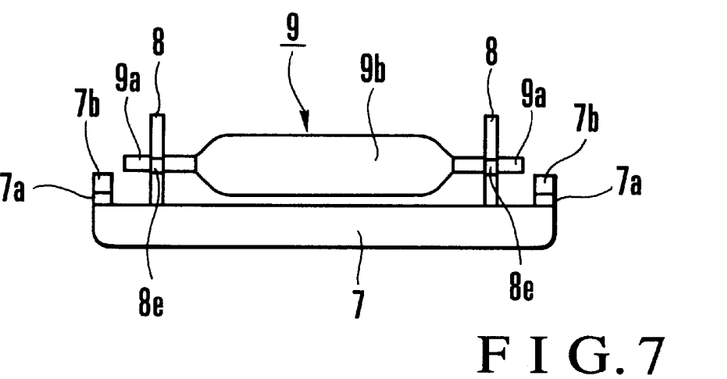
FIG. 7 is a front view of the terminal cover shown in FIG. 6.
Figure 8:
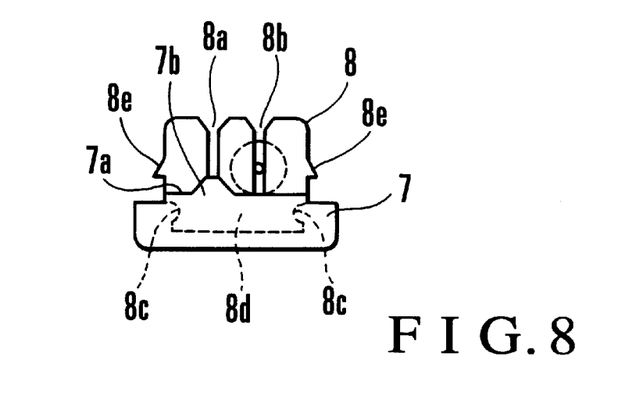
FIG. 8 is a right side view of the terminal cover shown in FIG. 6.

As shown in FIGS. 6 to 8, the pair of intermediate terminals 8 are inserted and fixed in the rectangular terminal cover 7 to be separated from each other in the longitudinal direction. The intermediate terminal 8 is made of a flat plate-like conductive member, and has a coil press-insertion groove 8a, a lead press-insertion groove 8b, an embedded portion 8d, and a pair of locking portions 8e. The connecting portions 2a and 2b of the exciting coil 2 are to be press-inserted in the coil press-insertion grooves 8a. The lead wires 9a of the temperature fuse 9 (to be described later) are to be press-inserted in the lead press-insertion grooves 8b. The embedded portion 8d has notched portions 8c formed at its two ends, and is embedded in the terminal cover 7. The pair of locking portions 8e bite into the wall surfaces of the terminal engagement-insertion grooves 6g upon being press-inserted in the terminal engagement-insertion grooves 6g of the storing portion 6.

A pair of engaging portions 7a formed parallel to the intermediate terminals 8 project from the end portions in the longitudinal direction of the terminal cover 7. Each engaging portion 7a is formed with a projecting portion 7b which is to be press-inserted in the corresponding coil engagement-insertion groove 6e, of the storing portion 6. The lead wires 9a of the temperature fuse 9 are press-inserted in the lead press-insertion grooves 8b of the intermediate terminals 8 fixed to the terminal cover 7, and the case 9b for the temperature fuse 9 is disposed in the space between the intermediate terminals 8.

The yoke assembly having the above structure is assembled in the following manner.

The exciting coil 2 is wound by the winding machine, and its pair of connecting portions 2a and 2b and initial winding end portion and terminal winding end portion are led out. Subsequently, while leading out the initial winding end portion and terminal winding end portion of the exciting coil 2 to the storing portion 3b side, substantially one half of the exciting coil 2 is fitted in the coil holding groove 3a of the coil bobbin 3.

While leading out the pair of connecting portions 2a and 2b of the exciting coil 2 to the storing portion 6 side, substantially the remaining half of the exciting coil 2 projecting from the coil bobbin 3 is fitted in the coil holding groove 4a of the coil cover 4. At this time, the two tapered abutment surfaces of the coil bobbin 3 and coil cover 4 are engaged with each other.

The through hole 1b of the yoke 1 and the storing portion 3b of the coil bobbin 3 are aligned with each other, and the coil assembly constituted by the exciting coil 2, coil bobbin 3, and coil cover 4 is fitted in the annular groove 1a of the yoke 1. After fitting, the plurality of caulking projections 1c are formed on the opening end face of the yoke 1 by pressing, and the coil assembly is held in the annular groove 1a.

At this time, the abutment surface of the coil cover 4 strongly engages with the abutment surface of the coil bobbin 3, and the interior of the coil bobbin 3 is sealed accordingly. The two abutment surfaces may be completely sealed by an adhesive or any other bonding technique in advance.

After the coil assembly is held in the annular groove 1a of the yoke 1, the connecting portions 2a and 2b of the exciting coil 2 that are cut into predetermined lengths are engaged and inserted in the coil engagement-insertion grooves 6e, of the storing portion 6 of the coil cover 4. Subsequently, the terminal cover 7 assembled with the intermediate terminals 8 and temperature fuse 9 is made to cover the storing portion 6. More specifically, while press-inserting the connecting portions 2a and 2b of the exciting coil 2 in the coil press-insertion grooves 8a of the intermediate terminals 8, the intermediate terminals 8 are press-inserted in the terminal engagement-insertion grooves 6g of the storing portion 6. The lead wires 9a of the temperature fuse 9 are engaged and inserted in the lead engagement-insertion grooves 6f, of the storing portion 6, and the case 9b for the temperature fuse 9 is placed on the bottom portion 6d (placing portion) of the storing portion 6.

Simultaneously, the engaging portions 7a are press-inserted between the side walls 6a and 6b of the storing portion 6, and the projecting portions 7b of the engaging portions 7a are press-inserted in the coil engagement-insertion grooves 6e, of the storing portion 6. The abutment surfaces of the storing portion 6 and terminal cover 7 are completely sealed with the adhesive or any other bonding technique. At this time, the locking portions 8e of the intermediate terminals 8 bite into the wall surfaces of the terminal engagement-insertion grooves 6g to prevent the terminal cover 7 and temperature fuse 9 from being disengaged.

The initial winding end portion and terminal winding end portion of the exciting coil 2 are engaged and inserted in the coil engagement-insertion grooves (not shown) of the storing portion 3b of the coil bobbin 3, and thereafter the pair of terminals (not shown) inserted in the terminal housing 5 are press-inserted in the terminal engagement-insertion grooves (not shown) of the storing portion 3b. As a result, the terminals and the respective end portions are electrically connected to each other. The terminal housing 5 is fixed to the yoke 1 with a pair of raise pieces (not shown) formed on a mounting plate 10 welded on the rear surface of the yoke 1.

The yoke assembly assembled with the above procedure is mounted on the compressor by fitting a plurality of projecting portions 10a (see FIG. 2) formed on the mounting plate 10 in a plurality of recessed portions 1a formed in a housing 11 for the compressor to determine the projecting direction of the terminal housing 5, and by fixing the mounting plate 10 on the housing 11 with screws. Through holes 10b (FIG. 2) are formed in the mounting plate 10 to allow the screws to extend through them.

A rotor 12 rotatably supported by a cylindrical support 11b formed in the housing 11 of the compressor will be described.

The rotor 12 is an annular member formed with an annular groove 12a which has a U-shaped section and into which the yoke 1 is to be inserted. The rotor 12 is constituted by an outer cylindrical portion 12b, an inner cylindrical portion 12c, and a disk portion 12d to which one end portion of the cylindrical portion 12b and one end portion of the cylindrical portion 12c are connected. The outer circumferential surface of the cylindrical portion 12b is formed with a belt groove 12e in which a belt (not shown) is to be fitted. The outer ring of a bearing 13, fitted in the support 11b so as not to be removed, is press-inserted in the cylindrical portion 12c.

The outer ring of the bearing 13 is fixed between an abutting surface 12f formed on the inner circumferential surface of the cylindrical portion 12c, and a plurality of caulking projections 12g formed on the end face of the cylindrical portion 12c. The disk portion 12d is formed with a plurality of arcuated magnetically insulating slits 12h intermittently formed on different circumferences. A side surface of the disk portion 12d on a side opposite to a side surface facing the yoke 1 serves as the friction surface 12i that opposes the friction surface 14a of the armature 14 through an air gap S.

The armature assembly 40 having the armature 14 will be described.

The armature assembly 40 has a hub 16, a stopper plate 17, a plurality of cup-like rubber covers 18, a plurality of damper rubbers 19, a plurality of torque transmission pins 20, and a disk-like armature 14. The hub 16 is spline-fitted on the shaft end of the rotary shaft 15 of the compressor. The stopper plate 17 is fixed to the flange of the hub 16 with a plurality of rivets. The rubber covers 18 respectively have through holes 18a concentric with through holes 17a of the stopper plate 17, and are welded to the stopper plate 17. The damper rubbers 19 are individually press-inserted in the rubber covers 18. The torque transmission pins 20 are inserted in and fixed to the centers of the respective damper rubbers 19. The armature 14 has the friction surface 14a and a plurality of arcuated magnetically insulating slits 14b. The friction surface 14a is connected to the distal ends of the respective torque transmission pins 20 extending through the through holes 17a and 18a, and opposes the friction surface 12i of the rotor 12 through the air gap S. The magnetically insulating slits 14b are intermittently formed on one circumference of the armature 14.

The armature assembly 40 having the above arrangement is mounted on the rotary shaft 15 with a bolt 22 extending through the through hole of a patch 21 fixed to the hub 16 and threadably engaged with the screw hole in the shaft end. A side surface of the armature 14 on a side opposite to the friction surface 14a abuts against the stopper plate 17. The self restoring force of the damper rubbers 19 can be obtained by elastically forming the near-center portions of the damper rubbers 19 to the armature 14 side when connecting the distal ends of the torque transmission pins 20 to the armature 14 while the armature 14 overlaps the stopper plate 17.

In the electromagnetic clutch having the above structure, the exciting coil 2 is energized by connecting the power supply connector to the terminal housing 5. The rotor 12 is rotated as it is driven by the belt applied in the belt groove 12e formed in its outer circumferential surface.

Accordingly, when a magnetic flux is generated upon energizing the exciting coil 2, the friction surface 14a of the armature 14 is magnetically attracted by the friction surface 12i of the rotating rotor 12. This rotates the rotary shaft 15 of the compressor to drive the compressor. When the exciting coil 2 is turned off and the magnetic flux disappears, the armature 14 is separated from the rotor 12 by the self restoring force of the damper rubbers 19, so that the compressor is stopped.

If the rotary shaft 15 of the compressor is locked during energizing the exciting coil 2, the friction surface 12i of the rotating rotor 12 and the friction surface 14a of the fixed armature 14 cause slip rotation. A slip heat generated by this slip rotation sharply increases the ambient temperature to fuse the temperature fuse 9. As a result, the exciting coil 2 is turned off and the magnetic flux disappears, so that the armature 14 is separated from the rotor 12.

Figure 9:
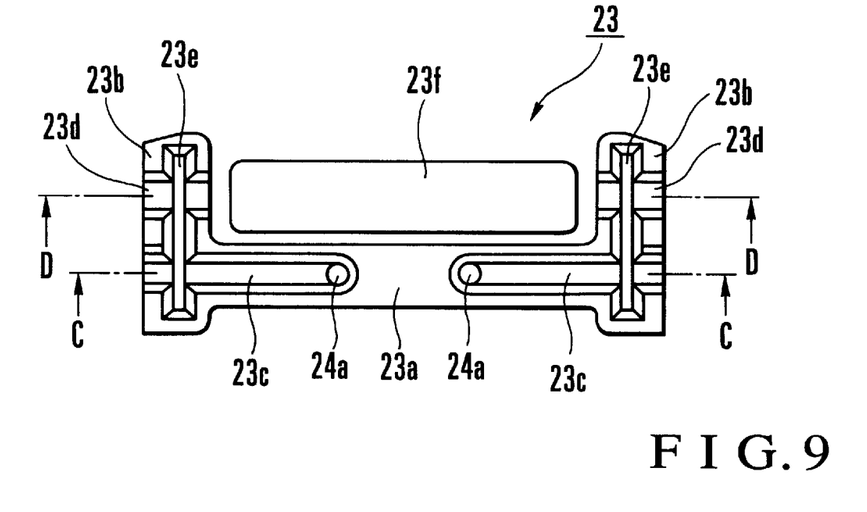
FIG. 9 is a plan view of a storing portion formed in a coil cover according to the second embodiment of the present invention.
Figure 10:
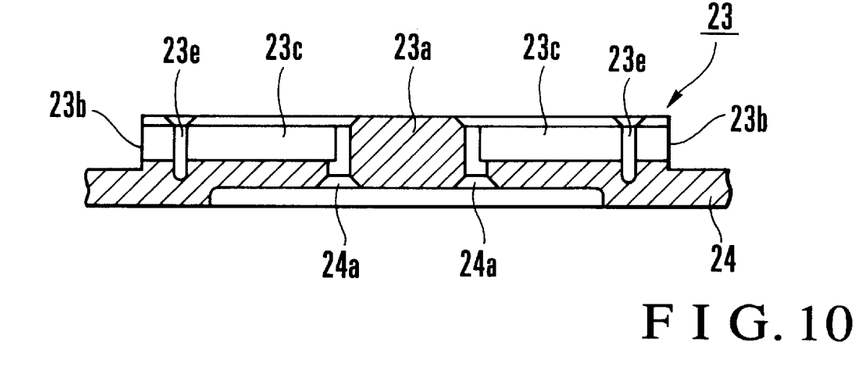
FIG. 10 is a sectional view taken along the line C—C of FIG. 9.
Figure 11:
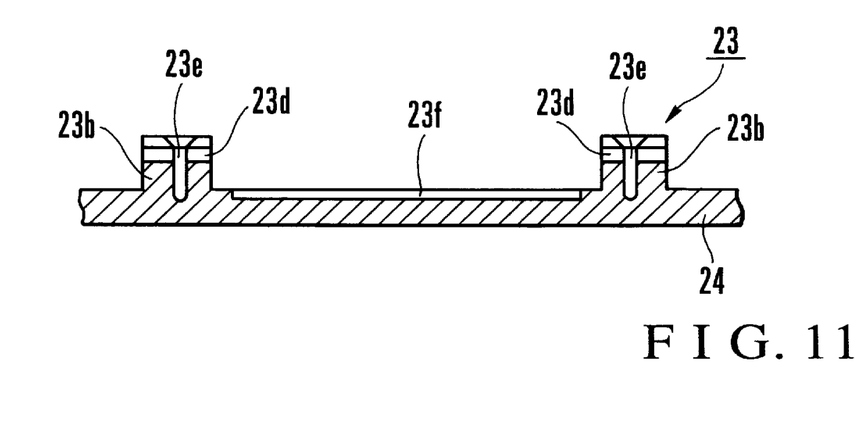
FIG. 11 is a sectional view taken along the line D—D of FIG. 9.
Figure 12:
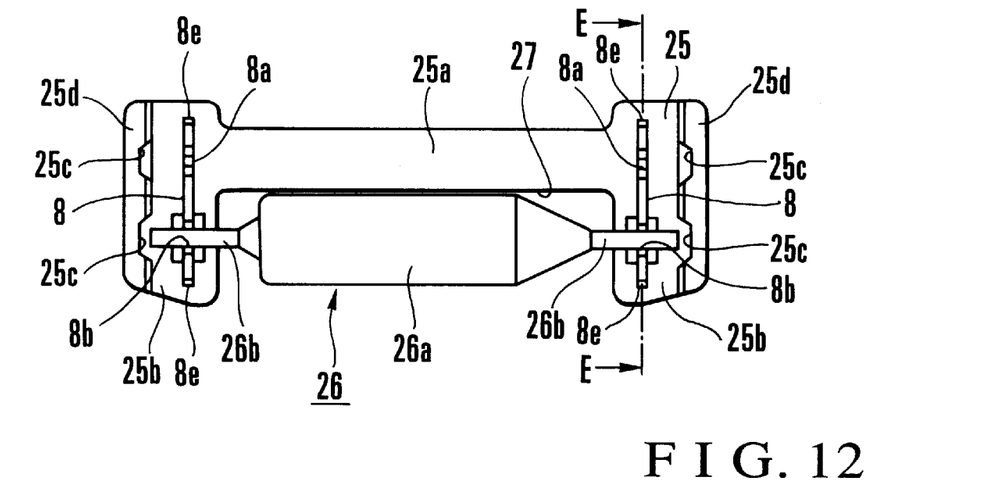
FIG. 12 is a plan view of a terminal cover according to the second embodiment of the present invention showing a state wherein a temperature fuse is connected to intermediate terminals.
Figure 13:
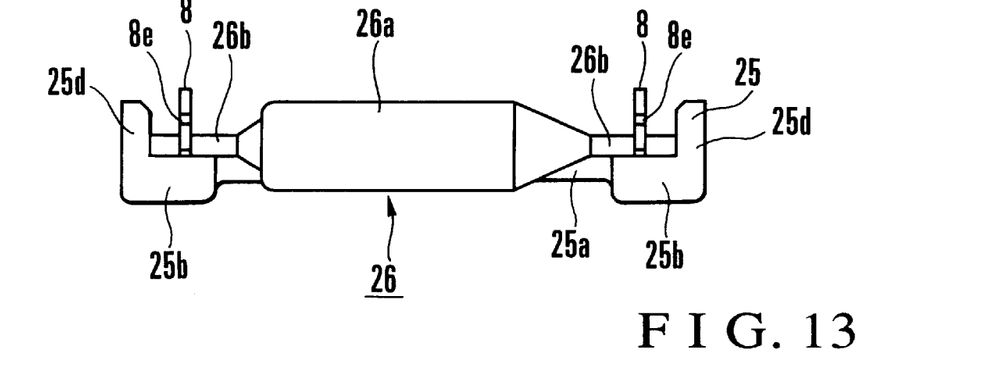
FIG. 13 is a front view of the terminal cover shown in FIG. 12.
Figure 14:
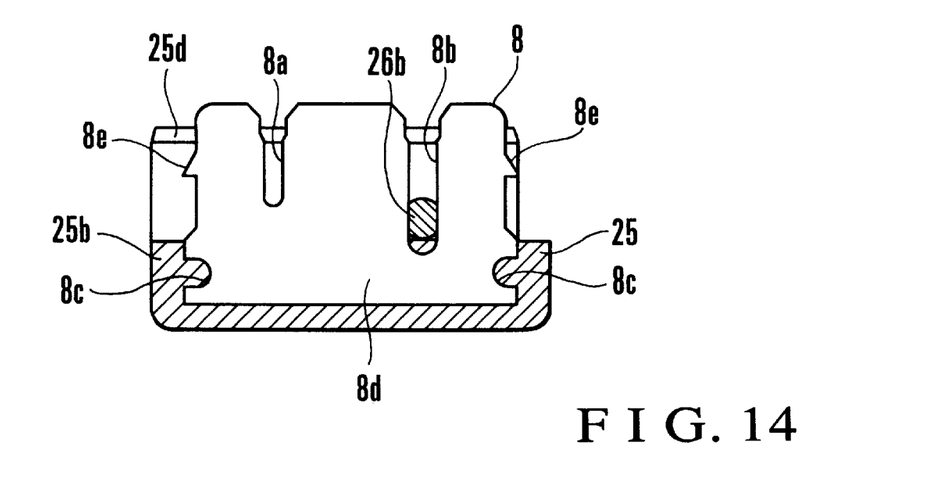
FIG. 14 is a sectional view taken along the line E—E of FIG. 12.

An electromagnetic clutch according to the second embodiment of the present invention will be described. FIGS. 9 to 11 show a storing portion formed in a coil cover according to the second embodiment, and FIGS. 12 to 14 show a terminal cover incorporated with intermediate terminals and a temperature fuse. The entire structure of this electromagnetic clutch is identical to that of the electromagnetic clutch shown in FIG. 1, and only portions different from their counterparts of the electromagnetic clutch shown in FIG. 1 will accordingly be described.

In this embodiment, a case 26a for a temperature fuse 26 is not covered with a terminal cover 25 but is exposed to the outside of a storing portion 23. More specifically, as shown in FIGS. 9 to 11, the storing portion 23 of a coil cover 24 comprises a rising portion forming a U-letter shape when seen in the plan view, and a recessed portion forming a rectangular shape when seen in the plan view.

The rising portion forms an engagement-inserting portion 23a and a pair of terminal press-inserting portions 23b. The engagement-inserting portion 23a is formed on a straight line extending parallel to a horizontal axis (a center line extending horizontally in FIG. 2) extending through the center point of the coil cover 24. The pair of terminal press-inserting portions 23b are connected to the two end portions of the engagement-inserting portion 23a and formed on a straight line extending parallel to a vertical axis (a center line extending vertically in FIG. 2) extending through the center of the coil cover 24.

The recessed portion is located at the central portion of the coil cover 24 to form a placing portion 23f where the case 26a of the temperature fuse 26 is to be placed.

The engagement-inserting portion 23a is formed with a pair of through holes 24a, and a pair of coil engagement-insertion grooves 23c extending on a straight line connecting the centers of the through holes 24a from the through holes 24a to the end portions of the terminal press-inserting portions 23b. Each terminal press-inserting portion 23b is formed with a lead engagement-insertion groove 23d parallel to the corresponding coil engagement-insertion groove 23c, and a terminal engagement-insertion groove 23e perpendicularly intersecting the corresponding lead engagement-insertion groove 23d and coil engagement-insertion groove 23c.

As shown in FIGS. 12 to 14, the terminal cover 25, which is made to cover this storing portion 23 and forms a U-letter shape when seen in a plan view, is formed with a rod-like coupling portion 25a, a pair of terminal fixing portions 25b, and side wall portions 25d. The coupling portion 25a is made to cover the engagement-inserting portion 23a of the storing portion 23. The pair of terminal fixing portions 25b are connected to each other with the coupling portion 25a, and made to cover the terminal press-inserting portions 23b of the storing portion 23. The side wall portions 25d are formed with recessed portions 25c opposing the corresponding groove end portions of the coil engagement-insertion grooves 23c and lead engagement-insertion grooves 23d of the storing portion 23. The side wall portions 25d are formed on the non-connecting-side side surfacer of the terminal fixing portions 25b.

The space surrounded by the coupling portion 25a and terminal fixing portions 25b is used as a storing space portion 27 for storing the case 26a of the temperature fuse 26. Intermediate terminals 8 are inserted and fixed in the respective terminal fixing portions 25b. At this time, between the pair of terminal fixing portions 25b, the coupling portion 25a is formed on a side where coil press-insertion grooves 8a of the intermediate terminals 8 oppose each other, and a side where the lead press-insertion grooves 8b of the intermediate terminals 8 oppose each other is used to form the storing space portion 27.

The terminal cover 25 having such a structure and made of a synthetic resin material is made to cover the storing portion 23 of the coil cover 24, and the abutment surfaces are entirely, Completely sealed with the adhesive or any other bonding technique. An assembly procedure for this is identical to that of the first embodiment. The second embodiment is different from the first embodiment in that the case 26a of the temperature fuse 26 is placed on the placing portion 23f of the storing portion 23 and is exposed to the outside of the storing portion 23.

The electromagnetic clutch, in which the case 26a of the temperature fuse 26 is exposed to the outside of the storing portion 23 in this manner, is used as a switch for driving or stopping the compressor, in the same manner as the electromagnetic clutch according to the first embodiment. Simultaneously, if the rotary shaft 15 of the compressor is locked, the temperature fuse 26 is fused by an increase in environmental temperature caused by a slip heat, and power transmission to the compressor is stopped.

In the embodiments described above, the electromagnetic clutch is applied to a compressor for an automobile air conditioning system. However, the present invention is not limited to this, and an electromagnetic clutch is mounted on a driven device or a driving device.

A flat plate-like conductive member is indicated as the intermediate terminal 8. Alternatively, a conductive member bent into a U-letter shape may be used, in which coil press-inserting grooves and lead press-inserting grooves are individually formed on its opposing side plates. In this case, two pairs of terminal engagement-inserting grooves are formed in the storing portion 6 or 23.

Although the temperature fuse 9 or 26 is disposed in the inner cylindrical portion of the yoke 1, it may be disposed in the outer cylindrical portion of the yoke 1. Engagement-inserting grooves may be formed in the storing portion 6 or 23 such that the connecting portions of the exciting coil 2 or the lead wires of the temperature fuse 9 or 26 are engaged and inserted in the coil cover 4 in the circumferential or radial direction.

As has been described above, according to the present invention, the connecting portions of the exciting coil and the lead wires of the temperature fuse are electrically connected to each other with the intermediate terminals. The operation of electrically connecting the connecting portions of the exciting coil and the lead wires of the temperature fuse with conventional bonding terminals becomes unnecessary. The operation of embedding the temperature fuse with a cast resin also becomes unnecessary. The productivity is improved to provide an inexpensive electromagnetic clutch.

Since the intermediate terminals are fixed to the terminal cover in advance, the number of assembly steps is reduced to improve the productivity. The temperature fuse can be incorporated in the terminal cover side in advance. To cover the storing portion of the coil cover with the terminal cover, it suffices to press-insert the connecting portions of the exciting coil in the coil press-inserting grooves of the intermediate terminals, facilitating the electrical connecting operation.

Since the case for the temperature fuse is exposed to the outside of the storing portion for the sake of improving the response performance, the reliability against stopping power transmission is improved.

What is claimed is:

1. An electromagnetic clutch comprising:
    an annular exciting coil having a pair of connecting portions at an intermediate winding portion thereof;
    an annular coil bobbin having a first coil holding groove for holding said exciting coil;
    an annular coil cover having a second coil holding groove for holding said exciting coil projecting from said coil bobbin;
    a storing portion formed on said coil cover, said storing portion having a pair of through holes from which said connecting portions of said exciting coil are led out;
    a temperature fuse stored in said storing portion and having a pair of lead wires;
    a pair of intermediate terminals arranged to oppose each other through a predetermined distance and having lead press-insertion grooves where said lead wires of said temperature fuse are to be press-inserted, and coil press-insertion grooves where said connecting portions of said exciting coil led out from said through holes are to be press-inserted;
    a terminal cover for fixing said intermediate terminals;
    a yoke for storing said coil bobbin, said coil cover, and said exciting coil so as to expose said storing portion to an outside;
    a rotor having an annular groove for storing said yoke and a first friction surface formed by a side surface opposite to said annular groove; and
    an armature having a second friction surface magnetically attracted by said first friction surface.

2. A clutch according to claim 1, wherein said coil cover storing portion has
    a pair of coil engagement-insertion grooves where said connecting portions of said exciting coil are to be engaged and inserted,
    a pair of lead engagement-insertion grooves where said lead wires of said temperature fuse are to be engaged and inserted,
    a placing portion formed on one of a portion between said coil engagement-insertion grooves and a portion between said lead engagement-insertion grooves to place said temperature fuse thereon, and a pair of terminal engagement-insertion grooves formed to intersect said coil engagement-insertion grooves and said lead engagement-insertion grooves to press-insert said intermediate terminals therein.

3. A clutch according to claim 2, wherein said terminal cover is applied on said storing portion while press-inserting said intermediate terminals in said terminal engagement-inserting grooves, so that said connecting portions of said exciting coil and said lead wires of said temperature fuse are electrically connected to each other through said intermediate terminals.

4. A clutch according to claim 2, wherein said temperature cover has a pair of terminal fixing portions formed to oppose each other to fix said intermediate terminals,  a coupling portion for coupling said terminal fixing portions to each other and formed between said terminal fixing portions on a side where said coil press-inserting grooves oppose each other, and  a storing space portion formed between said terminal fixing portions on a side where said lead press-inserting grooves oppose each other, and  said temperature fuse is stored in said storing space portion and exposed to an outside.

5. A clutch according to claim 1, wherein said storing portion is molded from a resin to be integral with said coil cover.

6. A clutch according to claim 1, wherein said clutch further comprises a fuse case for storing said temperature fuse, and  said fuse case is stored in said storing portion.

7. A clutch according to claim 1, wherein said second holding groove has an opening portion engaged with and fixed to an opening portion of said first holding groove.

8. An electromagnetic clutch including:

an annular exciting coil having a pair of connecting portions at an intermediate winding portion thereof;

an annular coil bobbin having a first coil holding groove for holding said exciting coil;

an annular coil cover having a second coil holding groove for holding said exciting coil projecting from said coil bobbin;

a storing portion resin-molded on said coil cover to be integral with said coil cover, said storing portion having a pair of through holes from which said connecting portions of said exciting coil are led out;

a temperature fuse stored in said storing portion and having a pair of lead wires;

a pair of intermediate terminals arranged to oppose each other through a predetermined distance and having lead press-insertion grooves where said lead wires of said temperature fuse are to be press-inserted, and coil press-insertion grooves where said connecting portions of said exciting coil led out from said through holes are to be press-inserted;

a terminal cover for fixing said intermediate terminals;

a yoke for storing said coil bobbin, said coil cover, and said exciting coil so as to expose said storing portion to an outside;

a rotor having an annular groove for storing said yoke and a first friction surface formed by a side surface opposite to said annular groove; and  an armature having a second friction surface to be magnetically attracted by said first friction surface, wherein said coil cover storing portion has   a pair of coil engagement-insertion grooves where said connecting portions of said exciting coil are to be engaged and inserted,   a pair of lead engagement-insertion grooves where said lead wires of said temperature fuse are to be engaged and inserted,   a placing portion formed on one of a portion between said coil engagement-insertion grooves and a portion between said lead engagement-insertion grooves to place said temperature fuse thereon, and   a pair of terminal engagement-insertion grooves formed to intersect said coil engagement-insertion grooves and said lead engagement-insertion grooves to press-insert said intermediate terminals therein, and  said terminal cover is made to cover said storing portion while press-inserting said intermediate terminals in said terminal engagement-inserting grooves, so that said connecting portions of said exciting coil and said lead wires of said temperature fuse are electrically connected to each other through said intermediate terminals.

* * * * *

UNITED STATES PATENT AND TRADEMARK OFFICE
CERTIFICATE OF CORRECTION

PATENT NO. : 5,984,069
DATED : November 16, 1999
INVENTOR(S) : Takahashi It is certified that error appears in the above-identified patent and that said Letters Patent is hereby corrected as shown below:

In column 6, line 49, delete "grooves 6e, of the storing portion 6" and insert -- grooves 6e of the storing portion 6 -- .

In column 7, line 4, delete "recessed portions 1a" and insert -- recessed portions 11a -- .

In column 9, line 15, delete "side surfacer" and insert -- side surfaces -- .

In column 9, line 31, delete "entirely, Completely sealed" and insert -- entirely, completely sealed -- .

Signed and Sealed this

Twenty-seventh Day of March, 2001

Attest:

NICHOLAS P. GODICI

*Attesting Officer*   *Acting Director of the United States Patent and Trademark Office*